(12) United States Patent
Foster et al.

(10) Patent No.: US 7,644,969 B2
(45) Date of Patent: Jan. 12, 2010

(54) COVER FOR INTERIOR TRIM COMPONENT AND METHOD OF ASSEMBLING SAME

(75) Inventors: Joshua Foster, Plain City, OH (US); Tatsuya Shiono, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 11/738,961

(22) Filed: Apr. 23, 2007

(65) Prior Publication Data

US 2008/0258496 A1   Oct. 23, 2008

(51) Int. Cl.
   *B60R 13/00* (2006.01)
   *D05B 15/00* (2006.01)

(52) U.S. Cl. .............. 296/1.08; 296/146.7; 296/70; 428/121; 112/475.08

(58) Field of Classification Search .............. 296/1.08, 296/146.7, 70; 428/31, 121, 102, 131, 134, 428/192; 112/439, 475.08, 475.17
   See application file for complete search history.

(56) References Cited

U.S. PATENT DOCUMENTS 5,913,996 A    6/1999   Ikegame et al.
6,177,155 B1*  1/2001   Kurosaki ............... 428/31
6,214,157 B1   4/2001   Spengler
6,708,462 B2   3/2004   Pokorzynski et al.
6,935,260 B2*  8/2005   Kromm et al. ......... 112/475.08
2003/0168151 A1  9/2003   Wright et al.

FOREIGN PATENT DOCUMENTS

| JP | 03-001938 | 1/1991 |
|---|---|---|
| JP | 08-183089 | 7/1996 |
| JP | 09-183155 | 7/1997 |
| JP | 11-192839 | 7/1999 |
| JP | 2001-063483 | 3/2001 |
| JP | 2001-138400 | 5/2001 |
| JP | 2002-079852 | 3/2002 |
| JP | 2005-053435 | 3/2005 |

* cited by examiner

*Primary Examiner*—Joseph D Pape
(74) *Attorney, Agent, or Firm*—Mark E. Duell; Rankin, Hill & Clark LLP

(57) ABSTRACT

A decorative cover for a vehicle trim component includes a resilient skin including an edge for insertion into a groove of the vehicle trim component. At least one tab extends from the skin edge. At least one line of stitching is located on the resilient skin. The at least one line of stitching has at least one stitching end section extending beyond the skin edge and onto the at least one tab.

20 Claims, 5 Drawing Sheets

COVER FOR INTERIOR TRIM COMPONENT AND METHOD OF ASSEMBLING SAME

BACKGROUND

The present disclose generally relates to an interior trim component assembly. Particularly, the present disclose relates to a tab provided on a stitched panel or cover that facilitates the hiding of an unsightly portion of decorative stitching on the cover when mounted to a trim component of the trim assembly.

In the automotive industry, it is known to provide interior trim components, such as interior door panels, dashboards, instrument panels, and the like, with a cover. One purpose of the cover may be simply to provide a more aesthetically pleasing viewing surface to the trim component receiving the cover. An often employed means for attaching the cover to the trim component is a process which typically involves the tucking of a fabric or leather edge of the cover into a groove or slot located on the trim component via a blade. Generally, this process creates a good finished appearance. However, many covers include stitching in order to give a "hand crafted" and more decorative appearance to the cover. Such a stitching is usually intended to appear as if it is required for the manufacture of the cover, but it is usually merely decorative.

When an aesthetic stitching is added to the cover, a concern in using the above process is the possible appearance of the stitching, or at least an unsightly portion of the stitching, in the trim component groove. When adding stitching to the cover, the stitching is typically doubled over itself adjacent the edge of the cover to prevent the stitching from unraveling. When the cover is tucked into the trim component groove, this edge stitching, particularly the doubled over portion, may be visible and is considered unsightly.

With varying degrees of success, many automotive manufacturers have attempted to address the above decorative problem. Heretofore, the techniques for addressing the issues surrounding the visible cover stitching have generally involved improvements in the method of tucking the panel into the trim component groove. Some of these techniques have not been very successful in achieving their objective and/or have unnecessarily increased production costs and complexity. Accordingly, it would be desirable to develop an improved cover and associated method for hiding edge stitching when a cover edge is tucked into a trim component groove that provides a desired aesthetic appearance without unduly increasing production costs and complexity.

BRIEF DESCRIPTION

In accordance with one aspect, a decorative cover for a vehicle trim component comprises a resilient skin including an edge for insertion into a groove of the vehicle trim component. At least one tab extends from the skin edge and at least one line of stitching is located on the resilient skin. The at least one line of stitching has at least one stitching end section extending beyond the skin edge and onto the at least one tab.

In accordance with another aspect, a vehicle interior trim component comprises a top surface having a seam. The seam includes opposed side walls and a bottom wall connecting the side walls. At least one opening is formed in one of the side walls and the bottom wall. A cover is secured to the top surface. The cover includes a sheet of resilient covering material having a peripheral edge and at least one tab extending from the peripheral edge. The peripheral edge is fitted into the seam between the side walls. The at least one tab extends at least partially through the at least one opening.

In accordance with yet another aspect, a method of attaching a cover, which includes a line of stitching, to a trim component of a vehicle is provided such that at least one end section of the line of stitching is not visible from within an interior of the vehicle. The method comprises the steps of providing the cover for the trim component. The cover member includes a sheet of resilient covering material having a peripheral edge and at least one tab integrally formed with the covering material and extending outwardly from the edge. The line of stitching is sewed on the cover such that the at least one stitching end section of the line of stitching is disposed on the at least one tab. A cushioned padding is attached to the sheet of covering material. The trim component is provided on an associated support for receiving and supporting the trim component thereon. The trim component includes a top surface including a groove. The groove has at least one opening disposed in a surface defining of the groove. The at least one opening is dimensioned to receive at least a tab end section of the at least one tab. The sheet of covering material is positioned on the trim component carried on the associated support such that the cushioned padding is facing the top surface. The end section of the at least one tab is inserted though the at least one opening of the trim component such that the at least one end section of the line of stitching extends through the at least one opening. The peripheral edge of the sheet of covering material is secured in the groove.

In accordance with still yet another aspect, a vehicle trim component assembly comprises a vehicle trim component adapted for overlying an interior part of a vehicle, and a decorative cover adapted for overlying at least a portion of the vehicle trim component. A grooved portion of the vehicle trim component defines a groove for receiving an edge of the decorative cover. An opening is defined in the grooved portion and within the groove for receiving a tab of the decorative cover extending from the decorative cover edge. A stitching is disposed on the cover and on the tab such that an unsightly portion of the stitching is received in the groove and in the opening so as to be removed from view within an interior of the vehicle.

DETAILED DESCRIPTION

Figure 1:
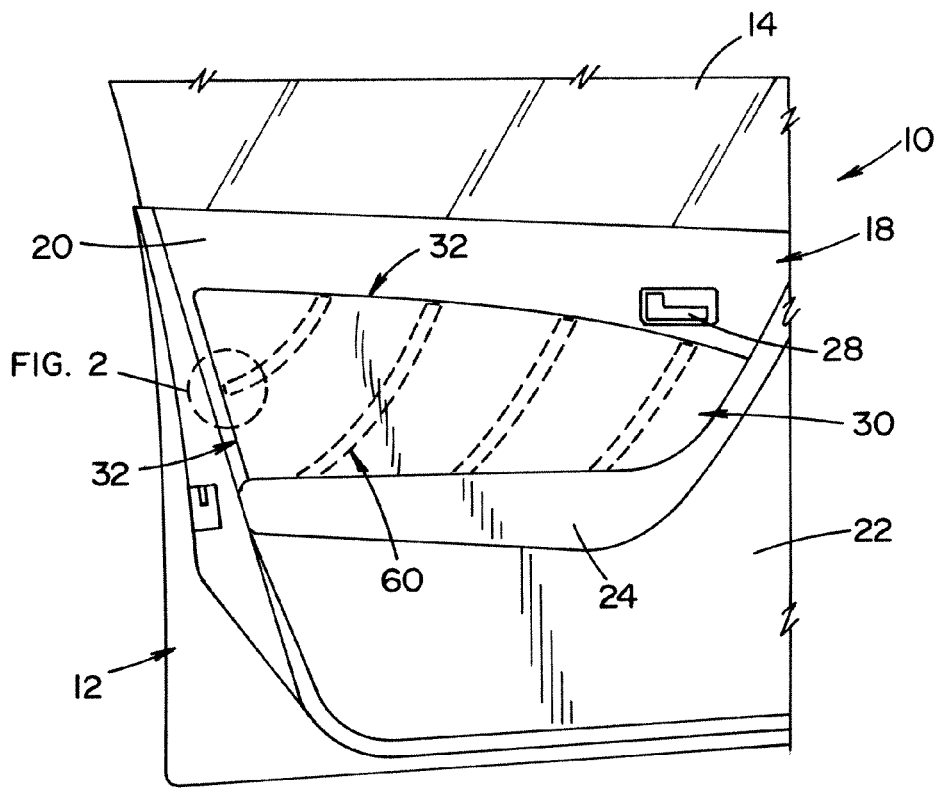
FIG. 1 is a partial front elevational view of a trim component assembly including a conventional stitched cover.

It should, of course, be understood that the description and drawings herein are merely illustrative and that various modifications and changes can be made in the structures disclosed without departing from the spirit of the invention. It will also be appreciated that the various identified components of the interior trim component and/or trim component assembly are merely terms of art that may vary from one manufacturer to another and should not be deemed to limit the scope of the present disclosure. All references to direction and position, unless otherwise indicated, refer to the orientation of the interior trim component illustrated in the drawings and should not be construed as limiting the claims appended hereto.

Referring now to the drawings, wherein like numerals refer to like parts throughout the several views, FIG. 1 illustrates a vehicle 10, such as an automobile, and particularly a passenger side door 12 thereon. Door 12 is mounted to a vehicle body of the vehicle 10 in a conventional manner and can include a window 14 above an interior trim component or substrate, such as interior door panel 18. Although the drawings illustrate the interior door panel, it should be appreciated that the interior trim component can be any interior part of the vehicle, for example, a dashboard, an instrument panel, a roof panel and any other component having a decorative cover. Typically, the substrate is formed of plastic or any other suitable material such as composite material having a textured or decorative hard outer surface conforming to the interior trim of the vehicle. The panel 18 may include upper and lower panels 20 and 22, respectively, an armrest 24 mounted thereon, a door actuating handle 28, and/or a switch pad (not shown) for actuating, for example, electrically operated windows, door locks, and the like.

To give the panel 18 a plush and an aesthetic appearance, the panel is covered with a decorative panel or cover 30, which can be cushioned. The cover 30 is joined to the panel 18 along one or more generally continuous seams 32 and together the cover and panel form an interior trim component assembly. The decorative cover 30 can be formed from a sheet of material such as Poly Vinyl Chloride (PVC). Other materials which may be used include a laminate material, Thermal Polymer Olefin (TPO) or a natural fiber mat mixed with polypropylene fibers. Alternately, other materials such as polypropylene or combinations of thermoplastic materials can be used. Frequently, the panel 18 and cover 30 will be of complimentary but different colors to add to the design appearance of the vehicle's interior. The cover 30 can extend to any desired position of the door 12.

Figure 2:
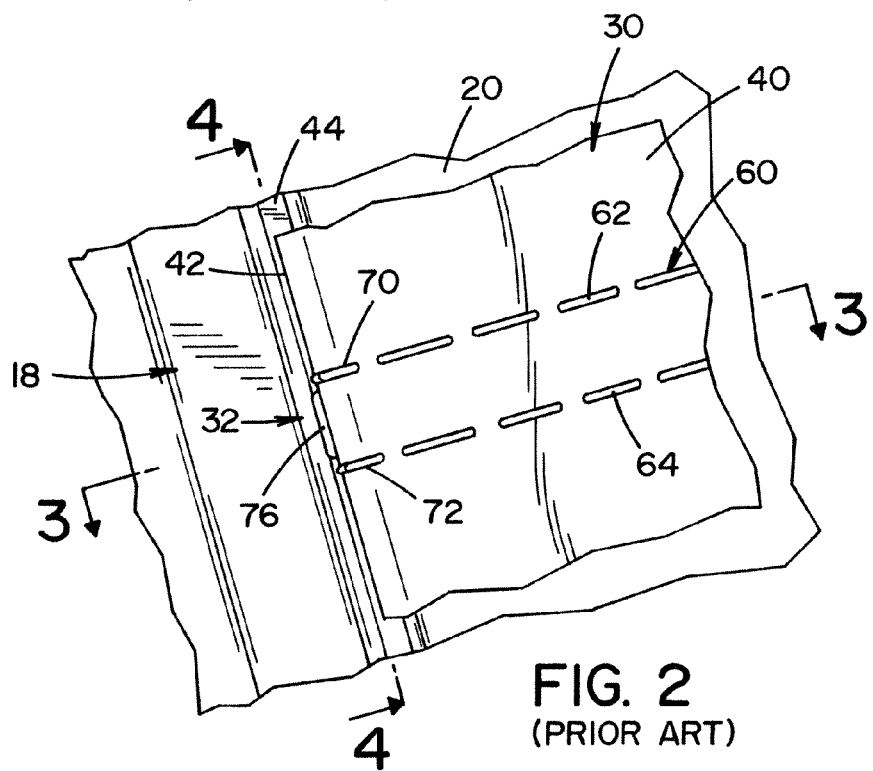
FIG. 2 is a partial enlarged front elevational view of the trim component assembly of FIG. 1.
Figure 3:
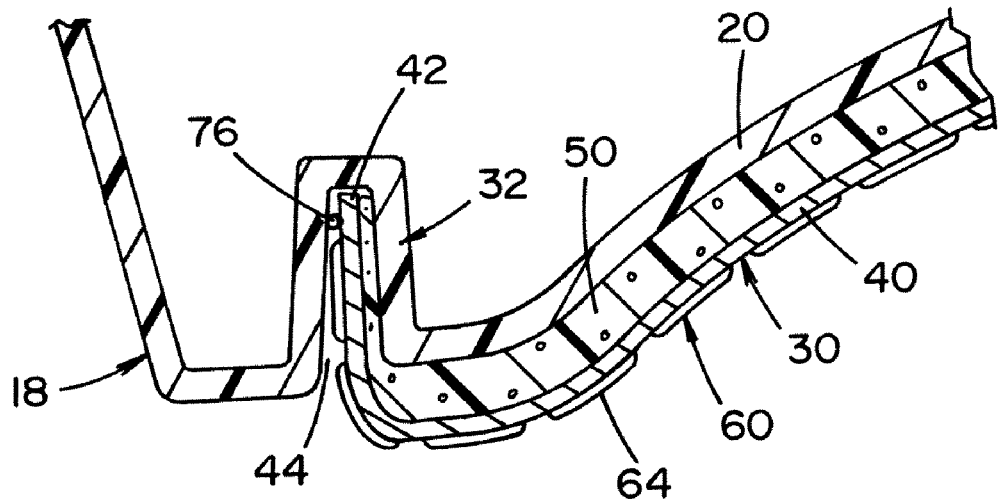
FIG. 3 is a cross sectional view of the trim component assembly of FIG. 2, the cross section taken generally along lines 3-3.

With reference to FIGS. 2 and 3, the cover 30 generally includes a resilient covering material or skin 40 having a peripheral edge 42. Once the cover is formed into a shape for a particular interior trim component, its peripheral edge is tucked into recesses or grooves 44 formed in the panel 18, such as at seam 32, by a tool member, such as a blade (not shown). The edge 42 can be held therein with a cushioning foam or padding 50, such as a closed-cell urethane foam. The foam also provides the padded or cushioned "feel" for the cover. When the cover does not include decorative stitching, the panel 18 and the cover 30 can be joined with a clean intersecting line between the two different materials.

Figure 4:
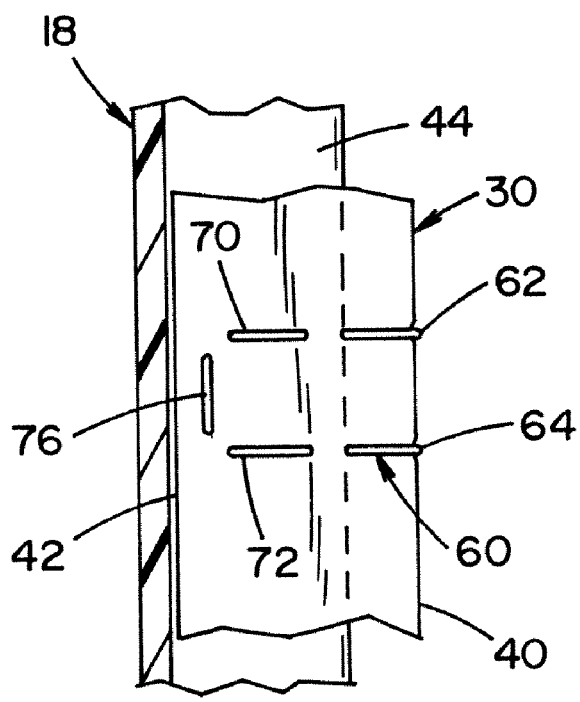
FIG. 4 is a cross sectional view of the trim componentassembly of FIG. 2, the cross section taken generally along lines 4-4.
Figure 5:
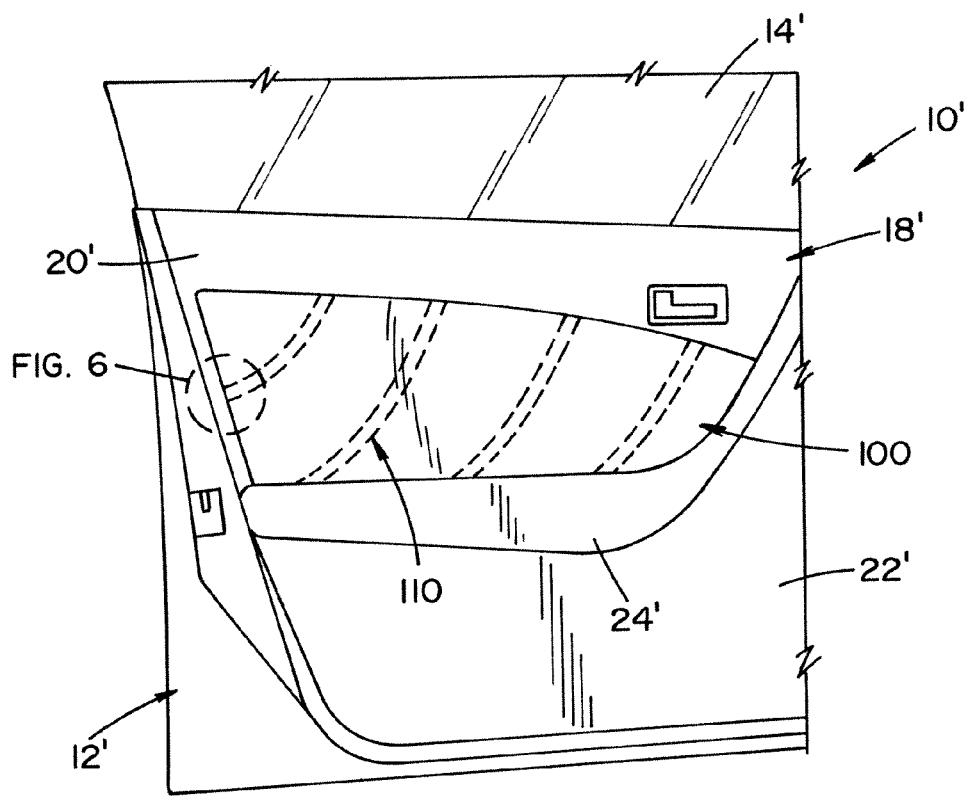
FIG. 5 is a partial front elevational view of an improved trim component assembly including a stitched cover.

As indicated previously, conventionally, when an aesthetic stitching or topstitching 60 (FIG. 1), which generally includes at least one line of stitching, is added to the cover 30, a concern is the possible appearance of the stitching, or at least unsightly portions of the stitching, in the trim component groove 44 of the seam 32. As shown in FIGS. 2 and 4, the aesthetic stitching of the illustrated embodiment includes a first line of stitching 62 and a second line of stitching 64. Each line of stitching 62 and 64 has at least one end section 70 and 72, respectively, adjacent the peripheral edge 42 of the skin 40. When adding the stitching 60 to the cover, the stitching typically has to double over itself adjacent the edge 42 of the cover to prevent the stitching from unraveling. Particularly, the respective end sections 70, 72 of the first and second lines of stitching 62, 64 are connected by a third line of stitching or an end stitching 76 (i.e., a doubled over portion or section of the stitching), which is adjacent the cover edge 42. As shown in FIG. 2, the cover 30 is tucked into the trim component groove 44. Because the groove includes opposed sidewalls that are spaced apart a sufficient distance that would enable viewing of the cover edge, the end stitching 76 can be externally visible from within the groove. Because the doubled over end stitching 76 is considered unsightly, its visibility prevents a clean and neat appearing seam 32 at the junction of the cover 30 and the panel 18.

With reference to FIGS. 5-9, an improved trim component assembly is shown including an improved decorative cover 100 for overlying at least a portion of a vehicle trim component, itself overlying an interior part of a vehicle (e.g., door 12). Except as indicated herein, most of the structure and function of the improved trim component assembly of FIGS. 5-9 is the same or similar to the trim component assembly of FIGS. 1-4. Accordingly, in FIGS. 5-9, reference numerals with a single primed suffix (') refer to like components (e.g., vehicle 10 is referred to by reference numeral 10'), and new numerals identify new components.

Figure 8:
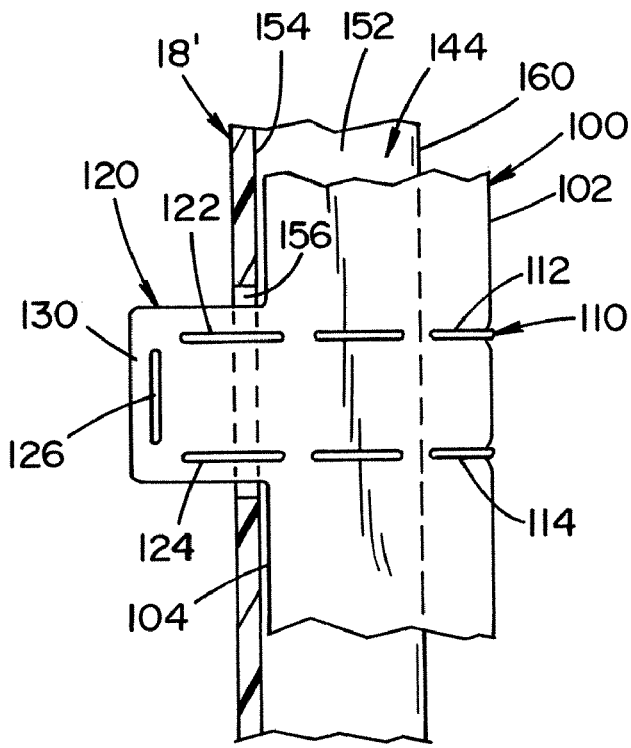
FIG. 8 is a cross sectional view of the trim component assembly of FIG. 2, the cross section taken generally along lines 8-8.
Figure 9:
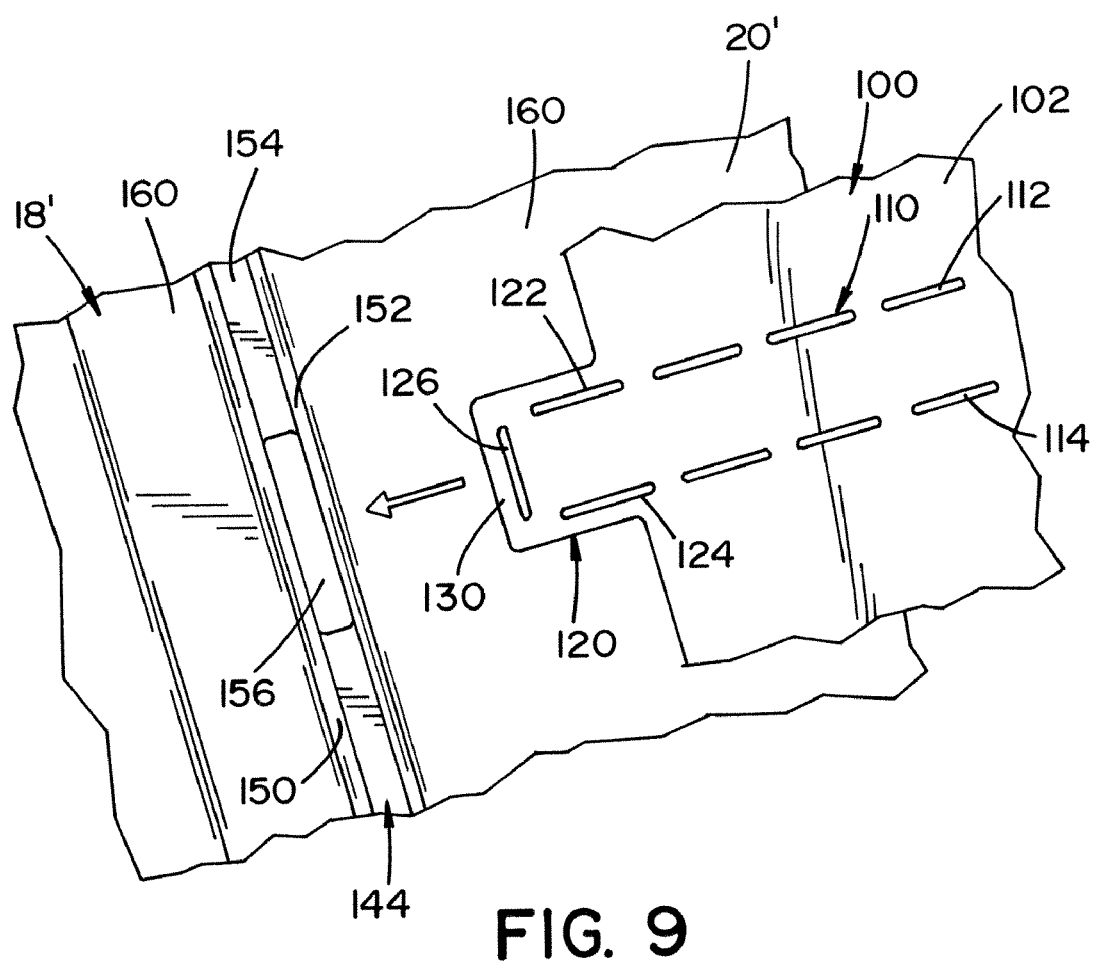
FIG. 9 is a partial front elevational view of the stitched cover and a trim component, both of the FIG. 5 trim component assembly, being secured together.

Similar to the prior art cover 30, decorative cover 100 generally includes a resilient covering material or skin 102 having a peripheral edge 104 and an aesthetic stitching or topstitching 110. As will be described in more detail below, the skin edge 104 can be configured to be securely fitted or received into a groove provided in a vehicle trim component to retain the cover thereto. The stitching 110 includes at least one line of stitching located on the skin 102. In the depicted embodiment, the stitching includes a first line of stitching 112 and a second line of stitching 114 extending along a significant portion of the cover. The cover 100 further includes at least one stitching tab 120 extending from the peripheral edge 104. As shown in FIG. 8, each line of stitching 112 and 114 has at least one stitching end section 122 and 124, respectively, which extends beyond the peripheral edge 104 of the cover 100 and onto the tab 120. Again, to prevent unraveling, the stitching can be doubled over at the edge of the tab. Particularly, the respective end sections 122, 124 of the first and second lines of stitching 112, 114 are connected by an a third line of stitching or an end stitching 126, often considered an unsightly portion of the stitching, which is disposed on the tab 120 adjacent a tab end section 130.

As discussed previously, and with reference to FIGS. 7-9, once the cover 100 is formed into a shape for a particular interior trim component, it is positioned on the trim component 18', at least partially covering the same, and its peripheral edge is tucked into recesses or grooves, including groove 144, formed in the panel 18'. More particularly, the trim component 18' includes a seam or grooved portion 32' that defines each of the grooves, including the groove 144, for receiving corresponding edges, such as edge 104, of the decorative cover 100. The groove 144 has at least one opening (e.g., opening 156) disposed on a surface defining the groove in which the at least one tab 120 is to be received (i.e., the groove is dimensioned to receive the tab 120). In the illustrated embodiment, the groove 144 is defined by the groove portion or seam 32' that includes opposed side walls 150 and 152 and a bottom wall 154 connecting the side walls.

Figure 6:
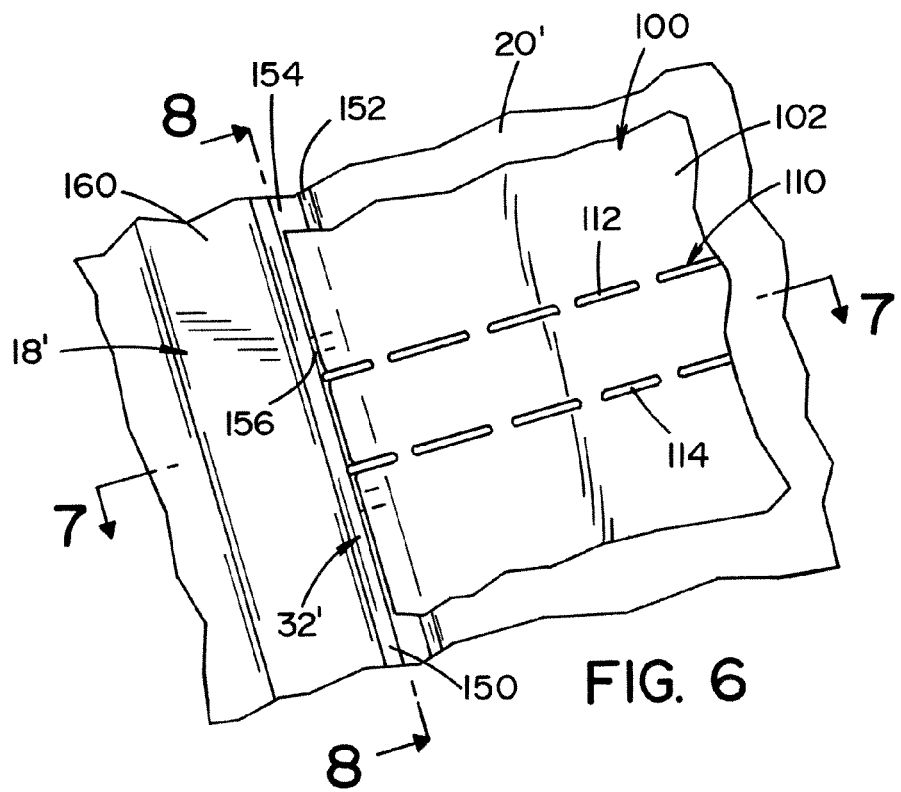
FIG. 6 is a partial enlarged front elevational view of the trim component assembly of FIG. 5.

The opening 156, which is defined in the grooved portion or seam 32' and within the groove 144 for receiving the tab 120, is formed in the bottom wall in the illustrated embodiment; although, it should be appreciated that the opening can be formed in one of the side walls without departing from the scope of the present disclosure. The opening is dimensioned to at least partially receive the tab 120. As the peripheral edge 104 of the cover 100 is fitted within the groove 144 between the side walls 150 and 152 of the groove 144, the tab is also received in the groove and at least partially inserted through the opening 156, such that the respective stitching end sections 122 and 124 of the first and second lines of stitching 112 and 114 and the end stitching 126 are located generally beneath the groove bottom wall 154. More particularly, portions of the end sections 122, 124 immediately adjacent the end stitching 126 and the end stitching itself are received in the groove and through the opening 156. As shown in FIG. 6, this provides a clean and neat appearance at the junction, i.e. seam 32', of cover 100 and panel 18' as the end stitching 126, an unsightly portion of the stitching 110, is not viewable from within an interior of the vehicle.

Figure 7:
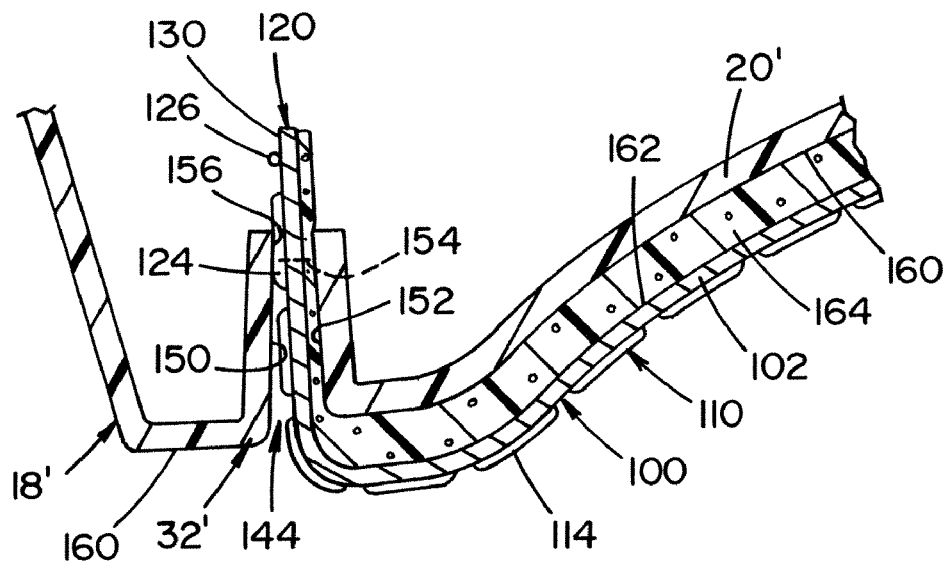
FIG. 7 is a cross sectional view of the trim component assembly of FIG. 2, the cross section taken generally along lines 7-7.

Similar to cover 30, cover 100 can further include a cushioning foam or padding 164 disposed between a top surface 160 of the trim component and a bottom surface 162 of the skin 102. The cushioned padding can at least partially seal the peripheral edge 104 of the skin within the trim component groove. As shown in FIG. 7, the padding is also disposed on the-tab; although, this is not required.

A method of attaching the cover 100 to a trim component (e.g., panel 18') such that at least one stitching end section of the at least one line of stitching 110 is not externally visible will now be described. The cover 100 is first provided for the trim component. The at least one line of stitching 110 is sewed on the cover such that at least one stitching end section is disposed on the at least one tab 120. As indicated above, in the illustrated embodiment, the at least one line of stitching includes the first and second lines of stitching 112, 114 which are connected the third line of stitching 126. The third line of stitching, considered an unsightly portion of the stitching 110, is disposed on the at least one tab and spaced from the tab end section 130. The cushioned padding 164 is attached to the cover 100 via conventional means. The trim component is provided on a support (e.g., door 12) for receiving and supporting the trim component thereon. The top surface 160 of the trim component includes the groove 144. The groove has at least one opening 156 disposed in a surface defining of the groove. The at least one opening 156 is dimensioned to receive at least a tab end section of the at least one tab 120. In the depicted embodiment of FIG. 7, the opening 156 is formed in the bottom wall 154 of the groove 144. The cover 100 is positioned on the trim component carried on the support such that the cushioned padding is facing the top surface. The end section 130 of the at least one tab 120 is inserted though the at least one opening 156 of the trim component such that the at least one end section of the line of stitching 110 extends through the at least one opening 156. The peripheral edge 104 of the cover 100 is then secured in the groove 144 with the use of a tool member, such as a blade (not shown). It should be appreciated the above described method is by way of example only and that alternative methods for attaching the cover 100 to the trim component are also contemplated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle trim component comprising:
    a top surface including a groove; and
    a decorative cover secured to said top surface, said cover including:
        a resilient skin including an edge for insertion into said groove of the vehicle trim component;
        at least one tab extending from said skin edge; and
        at least one line of stitching located on said resilient skin, said at least one line of stitching having at least one stitching end section extending beyond said skin edge and onto said at least one tab.

2. The trim component of claim 1, wherein said at least one line of stitching includes a first line of stitching and a second line of stitching, respective stitching end sections of said first and second lines of stitching being connected by a third line of stitching disposed on said at least one tab.

3. The trim component of claim 2, wherein said third line of stitching is adjacent a tab end section of said at least one tab.

4. The trim component of claim 1, wherein said skin at least partially covers the trim component, the trim component including the groove has at least one opening disposed on a surface defining the groove in which said at least one tab is received.

5. The trim component of claim 4, wherein said edge of said skin is configured to be securely fitted within said groove, wherein said at least one tab and said at least one stitching end section of said at least one line of stitching at least partially extending through said at least one opening.

6. The trim component of claim 4, further comprising a cushioned padding disposed between a top surface of the trim component and a bottom surface of said skin, said cushioned padding at least partially sealing said edge of said skin within the trim component groove.

7. A vehicle interior trim component comprising:
    a top surface having a seam, said seam including opposed side walls and a bottom wall connecting said side walls;
    at least one opening formed in one of said side walls and said bottom wall;
    a cover secured to said top surface, said cover including:
        a sheet of resilient covering material having a peripheral edge, and
        at least one tab extending from said peripheral edge,
        wherein said peripheral edge is fitted into said seam between said side walls and said at least one tab extends at least partially through said at least one opening.

8. The trim component of claim 7, wherein said cover includes a topstitching, said topstitching having at least one stitching end section located on said at least one tab, wherein upon insertion of said at least one tab in said at least one opening, said at least one stitching end section of said topstitching is removed from view within an interior of the vehicle.

9. The trim component of claim 8, wherein said topstitching includes a first line of stitching and a second line of stitching, respective stitching end sections of said first and second lines of stitching being adjacent a tab end section of said at least one tab.

10. The trim component of claim 9, wherein said stitching end sections of said first and second lines of stitching are connected by a third line of stitching, said third line of stitching being adjacent said tab end section of said at least one tab.

11. The trim component of claim 7, further comprising a cushioned padding disposed between said top surface and said sheet of covering material, said cushioned padding at least partially sealing said peripheral edge of said covering material within said seam.

12. A method of attaching a cover including a line of stitching to a trim component of a vehicle such that at least one end section of said line of stitching is not visible from within an interior of the vehicle, said method comprising the steps of:
   providing said cover for said trim component, wherein said cover member includes a sheet of resilient covering material having a peripheral edge, and at least one tab integrally formed with said covering material and extending outwardly from said edge;
   sewing said line of stitching on said cover such that said at least one stitching end section of said line of stitching is disposed on said at least one tab;
   attaching a cushioned padding to said sheet of covering material;
   providing said trim component, said trim component including a top surface including a groove, said groove having at least one opening disposed in a surface defining said groove, said at least one opening dimensioned to receive at least a tab end section of said at least one tab;
   positioning said sheet of covering material on said trim component such that said cushioned padding is facing said top surface;
   inserting said end section of said at least one tab though said at least one opening of said trim component such that said at least one end section of said line of stitching extends through said at least one opening; and
   securing said peripheral edge of said sheet of covering material in said groove.

13. The method of claim 12, further comprising the steps of sewing a second line of stitching on said cover.

14. The method of claim 13, further comprising the step of sewing a third line of stitching on said cover, said third line of stitching being disposed on said at least one tab and spaced from said tab end section of said at least one tab, said third line of stitching connecting said at least one stitching end section of said line of stitching to at least one stitching end section of said second line of stitching.

15. The method of claim 14, further comprising the steps of inserting said third line of stitching through said at least one opening of said trim component.

16. The method of claim 12, wherein securing said peripheral edge of said sheet of covering material in said groove is done with the use of a blade.

17. A vehicle trim component assembly, comprising:
   a vehicle trim component adapted for overlying an interior part of a vehicle;
   a decorative cover adapted for overlying at least a portion of said vehicle trim component;
   a grooved portion of said vehicle trim component defining a groove for receiving an edge of said decorative cover;
   an opening defined in said grooved portion and within said groove for receiving a tab of said decorative cover extending from said decorative cover edge; and
   a stitching disposed on said cover and on said tab such that an unsightly portion of said stitching is received in said groove and in said opening so as to be removed from view within the interior of the vehicle.

18. The vehicle trim component assembly of claim 17 wherein said stitching includes first and second lines of stitching extending along a significant portion of said cover and a doubled-over portion that connects said first and second lines of stitching, said doubled-over portion received in said groove and in said opening so as to be removed from view within the interior of the vehicle.

19. The vehicle trim component assembly of claim 17, wherein said grooved structure includes opposed side walls that are spaced apart a sufficient distance that would enable viewing of said unsightly portion unless received in said opening.

20. The vehicle trim component assembly of claim 17 wherein said grooved portion includes opposed side walls and a bottom wall and said opening is formed on said bottom wall.

* * * * *